United States Patent [19]

De Vries et al.

[11] 4,094,799

[45] June 13, 1978

[54] SOLID PARTICLES-CONTAINING LUBRICATING OIL COMPOSITION AND METHOD FOR USING SAME

[75] Inventors: Donald L. De Vries, South Holland; James M. DeJovine, Homewood, both of Ill.

[73] Assignee: Atlantic Richfield Company, Philadelphia, Pa.

[21] Appl. No.: 752,225

[22] Filed: Dec. 20, 1976

[51] Int. Cl.² .................. C10M 1/10; C10M 3/02; C10M 5/02; C10M 7/04
[52] U.S. Cl. ........................... 252/29; 252/25; 252/51.5 A
[58] Field of Search .............. 252/25, 51.5 A, 29

[56] References Cited

U.S. PATENT DOCUMENTS

| 3,502,581 | 3/1970 | Cyba | 252/51.5 A |
| 3,506,574 | 4/1970 | Stambaugh et al. | 252/51.5 A |
| 3,595,789 | 7/1971 | Coshburn | 252/51.5 A |
| 3,842,009 | 10/1974 | Barry et al. | 252/25 |

*Primary Examiner*—Delbert E. Gantz
*Assistant Examiner*—Irving Vaughn
*Attorney, Agent, or Firm*—Frank J. Uxa

[57] ABSTRACT

An improved lubricating oil composition comprising a major amount of oil of lubricating viscosity; a minor amount by weight of solid particles effective to improve the lubricating properties of the composition; and a minor amount by weight of at least one of certain copolymers derived from the polymerization of (1) an N-vinyl-pyrrolidone, and (2) an oil-soluble acrylic ester.

An improved method for lubricating an internal combustion engine is also disclosed.

18 Claims, No Drawings

SOLID PARTICLES-CONTAINING LUBRICATING OIL COMPOSITION AND METHOD FOR USING SAME

This invention relates to improved lubricating oil compositions. More particularly, this invention relates to lubricating oil compositions which include solid materials to enhance the properties of such compositions.

Oil compositions are conventionally used to lubricate internal combustion engines, for example, such engines which power motor vehicles. Previous studies have indicated that the inclusion of certain solid materials, e.g., graphite, in these oil compositions improves the engine's fuel efficiency. For example, studies reported in "Stable Colloid Additives For Engine Oils – Potential Improvement in Fuel Economy", James E. Bennington et al, Society of Automotive Engineers, Fuels and Lubricants Meeting, Houston, Texas, June 3–5, 1975, indicate that a gasoline mileage improvement of between 3 to 5 percent is obtained by adding one percent graphite to a conventional lubricating oil composition. Such improvement in fuel economy is particularly valuable in view of, for example, the short supply of such fuels.

However, other criteria must be met by lubricating oil compositions in order to be effective in modern internal combustion engines. For example, such compositions are required to meet certain specifications with regard to tendency to form deposits, e.g., varnish, sludge and the like, on engine components. The presence of the solid lubricants in these compositions tends to increase these deposit forming tendencies. A lubricating oil composition containing at least one of certain solid lubricants and having acceptable deposit forming characteristics is clearly desirable.

Therefore, one object of the present invention is to provide an improved lubricating oil composition.

Another object of this invention is to provide a solid particles — containing lubricating oil composition having reduced deposit forming tendency.

A still further object of the invention is to provide an improved method of lubricating an internal combustion engine. Other objects and advantages of the present invention will become apparent hereinafter.

An improved lubricating oil composition has now been discovered. This composition comprises a major amount by weight of oil of lubricating viscosity; a minor amount by weight of solid particles effective to improve the lubricating properties of the composition; and a minor amount by weight of at least one of certain copolymers. The presently useful copolymers are derived from the polymerization of (1) an N-vinyl pyrrolidone and (2) an oil-soluble acrylic ester. The copolymer is present in the present compositions in an amount effective to reduce the deposit forming tendency of the compositions. It is important that the amount of copolymer (by weight) in the lubricating oil composition be at least equal to, e.g., equal to or greater than the amount of solid particles present. The incorporation of such amounts of these copolymers into the present solid particles-containing compositions has been found to provide a surprising degree of reduction in detrimental deposit formation, e.g., on internal combustion engine components lubricated by the present compositions.

The oils used in the compositions of the present invention are those conventionally used in lubricant manufacture. The suitable lubricating oils include those having a viscosity within the range of about 50 SUS to about 2000 SUS at 100° F. These oils may be refined or otherwise processed to produce an oil having the desired quality. Although mineral oils are preferred, the oil may be synthetic in nature. The oil used in the present invention is preferably a mineral oil having a viscosity of about 100 SUS to about 1000 SUS at 100° F. Combinations of two or more different oils in a single lubricating composition are within the scope of the present invention. The lubricating oil comprises a major proportion, preferably at least about 60 percent, still more preferably at least about 70 percent, by weight of the total composition.

The present compositions include a minor amount by weight of solid particles effective to improve the lubricating properties of the compositions. Preferably, a major portion, by weight, and more preferably substantially all, of such solid particles, have a maximum transverse dimension in the range of about 1 millimicron to about 2 microns, and most preferably in the range of about 1 millimicron to about 1 micron. Suitable solid particles for use in the present invention include those materials known to provide improved lubricating properties to lubricating oil compositions. Such solid particles include, for example, graphite, molybdenum disulfide, zinc oxide, tungsten disulfide, mica, boron nitride, borax, silver sulfate, cadmium iodide, lead iodide, barium fluoride, tin sulfide, mixtures thereof and the like. The solid particles useful in the present compositions are preferably selected from the group consisting of graphite, molybdenum disulfide, zinc oxide, and mixtures thereof; more preferably from the group consisting of graphite, molybdenum disulfide and mixtures thereof; and most preferably, graphite.

The solid particles and preferably present in the present compositions in an amount of about 0.05% to about 5%, more preferably about 0.1% to about 2%, by weight of the total composition. The solid particles component of the present composition is preferably prepared as a colloidal suspension in, for example, a conventional lubricating oil and/or at least one conventional lubricating oil detergent. For example, such colloidal suspensions or concentrates may contain about 2% to about 25% or more, by weight of such solid particles.

Any conventional lubricating oil detergent may be used to aid in stabilizing these colloidal suspensions of the presently useful solid particles. Such detergents are often characterized as comprising at least one surface active compound which, when included in a lubricating oil composition tends to inhibit solid contaminants, e.g., combustion byproduct present in the engine's lubricating oil, from adhering to metallic surfaces of engine components. Although both ash-containing, metal-based detergents and ashless detergents are useful as such solid particles-containing suspension, the ashless detergents are preferred.

There are many examples of ash-containing, metal-based detergents which are suitable in such solid particles-containing suspension. The ashless detergents preferred for use are compounds which comprise an oil-solubilizing tail and a polar detergent head. Many ashless detergents fitting this general description are known to the art and are commercially available.

Specific examples of this type of ashless detergent include the polyamino-polyalkylene alkenyl succinimides and the N-dialkylaminoalkyl alkenyl succinimides. Amine salts of alkyl phosphoric acids, are also suitable. Polyamine derivatives of long chained hydrocarbons may also be used. Reaction products of alkylene polyamines with long chained alkenyl succinic anhydrides and long chained esters of Mannich bases are suitable detergents. As can be seen, the required polarity may be supplied by groups containing, for example, oxygen, sulfur, phosphorous, nitrogen and mixtures thereof. All of these suitable ashless detergents may be generally characterized as compounds comprising at least one substantially hydrocarbon portion of sufficient size to render the compound oil-soluble and at least one non-metallic polar portion which when attached to the hydrocarbon portion provides a substantial part, often essentially all, of the detergent action.

To illustrate, specific examples of ashless detergents suitable for use as solid particles stabilizers include polyaminepolyalkylene alkenyl succinimides, long chain polyamines, dihydrocarbon substituted polyamines, substituted-phenol substituted polyamine products and mixtures thereof. These compounds may be represented by the following structures:

Polyamine-Polyalkylene Alkenyl Succinimides

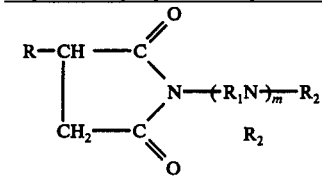

Long Chain Polyamines

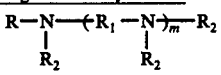

Dihydrocarbon Substituted Polyamines

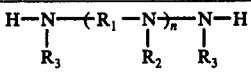

Substituted Phenol-Substituted Polyamine Products

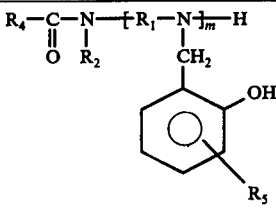

wherein R is a substantially hydrocarbon monovalent radical containing from about 30 to about 250 carbon atoms; each $R_1$ is an independently selected substantially hydrocarbon divalent radical containing from 1 to about 8 carbon atoms; each $R_2$ is independently selected from the group consisting of H and substantially hydrocarbon monovalent radicals containing from 1 to about 8 carbon atoms; each $R_2$ is an independently selected substantially hydrocarbon monovalent radical containing from about 15 to about 100 carbon atoms; $R_4$ is substantially hydrocarbon monovalent radical containing from 2 to about 30 carbon atoms; each $R_5$ is an independently selected substantially hydrocarbon monovalent radical containing from about 4 to about 30 carbon atoms; $m$ is an integer from 1 to about 10, preferably from 2 to about 10, and $n$ is an integer from zero to about 10, preferably from about 2 to about 6.

It is preferred that R and $R_3$ be alkenyl, preferably selected from the group consisting of polypropenyl and polyisobutenyl. It is preferred that each $R_1$ be an independently selected alkylene radical containing from 1 to about 8, more preferably from 2 to about 6, carbon atoms. Suitable alkylene radicals from which each $R_1$ may be independently selected include methylene, ethylene, propylene, butylene, hexylene, octylene and the like. Although each $R_1$ may be independently selected, it is preferred that for any given ashless detergent all the $R_1$'s contained therein are the same radicals.

The substantially hydrocarbon monovalent radicals from which each $R_2$ may be indpendently selected each contain from 1 to about 8, preferably from 1 to about 4, carbon atoms. These substantially hydrocarbon radicals include alkyl, such as methyl, ethyl, propyl, butyl, hexyl, octyl and the like, alkenyl, such as ethenyl, propenyl, butenyl, hexenyl, octenyl and the like; aryl, alkaryl, alkyl, alkenaryl and aralkenyl, such as phenyl, methyl phenyl, phenyl ethyl, ethenyl phenyl, phenyl ethenyl and the like.

The substantially hydrocarbon radicals from which $R_4$ is selected contain from 2 to about 30, preferably from about 4 to about 24, carbon atoms. These radicals may be straight chain or branched, saturated or unsaturated, aliphatic (including cycloaliphatic), aromatic or combinations thereof. Examples of suitable radicals include alkyl such as butyl, octyl, decyl, dodecyl, octadecyl, $C_{24}$ alkyl and the like; alkenyl such as butenyl, octenyl, dodecenyl, octydecenyl, $C_{24}$ alkenyl and the like; and aryl, alkaryl, aralkyl, alkenaryl, aralkenyl such as phenyl, benzyl, naphthyl, ethyl phenyl, decyl phenyl, octadecyl phenyl, phenyl butyl, phenyl decyl, phenyl octadecyl, butenyl phenyl, decenyl phenyl, octadecenyl phenyl, phenyl butenyl, phenyl decenyl, phenyl octadecenyl and the like. More preferably, $R_4$ is selected from the group consisting of alkyl and alkenyl containing from about 10 to about 24 carbon atoms.

Each $R_5$ is preferably independently selected from alkyl radicals containing from 4 to about 30, preferably from about 8 to about 20, carbon atoms. Examples of radicals from which each $R_5$ may be independently selected include amyl, octyl, decyl, octadecyl and the like. The

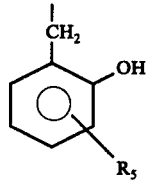

portion of the substituted phenol substituted polyamine acid salts may be replaced by, for example, alkylnaphthols and similar derivatives of biphenyl, terphenyl, phenanthrene, anthracene and the like.

The term "substantially" hydrocarbon radicals referred to herein includes those radicals which are composed primarily of carbon and hydrogen and also includes radicals which contain, in addition, minor amounts of substituents, such as oxygen, halide, sulfur, nitrogen and the like which do not substantially affect the hydrocarbon character of the radicals.

The specific ashless detergents noted above, as well as other of the many suitable ashless detergent materials and methods for preparing these materials are described in the following U.S. Pat. Nos. 3,236,614, 3,018,247; 3,513,093; 3,753,670; 3,008,993; 3,275,554; 3,573,011;

clohexyl, cyclopentyl, and dicyclopentyl. Similarly, the alcohol residue used for forming a polymerizable ester or ether may contain a heteroatom, such as oxygen, sulfur, nitrogen, halogen, phosphorus and the like. Typical of these groups are methoxyethyl, ethoxyethyl, methylthiomethyl, butoxyethyl, ethoxypropyl, methylthioethyl, chloropropyl, 4-chlorobutyl, butoxybutyl, phenoxyethyl, octylphenoxyethyl in which there are up to about 30 or more ether groups, cyclohexoxypropyl, benzoxyethyl, dodecylthioethoxyethyl, 2-(ethylsulfinyl) ethyl, butylsulfinylethyl, phenylsulfinylmethyl, dimethylaminoethyl, dibutylaminoethyl, tert-butylaminoethyl, dimethylaminoethoxyethyl, diethylphosphatoethyl, or diethylphosphonomethyl.

Typical vinyl ethers are vinyl butyl ether, vinyl octyl ether, vinyl dodecyl ether, vinyl hydroxyethyl thioether, and vinyl tetradecyl thioether. In place of vinyl alkyl ethers there may be used vinyl ethers having a ring substituent as in vinyl phenyl ether, vinyl benzyl ether, or vinyl cyclohexyl ether.

Polymerizable amides of chief interest are acrylamide, methacrylamide, and their N-substituted derivatives, including such compounds as N-methyl, N-dimethyl, N-octyl, N-dodecyl, N-cyclohexyl, N-phenyl, N-methyl-N-benzyl, N-butoxymethyl, N-(dimethylaminoethyl), or N-B-cyanoethyl acrylamide or methacrylamides.

Up to about 25% based on the weight of the final co-polymer of such miscellaneous monomer or monomers may be used, if desired, but such use is optional.

To prepare the presently useful graft co-polymers, the backbone polymer, which may be formed using conventional techniques well known in the art, containing at least one acrylic and/or methacrylic ester supplying oil-solubility, with or without other polymerizable monoethylenically unsaturated compounds, is treated with a free radical polymerization initiator. This initiator may be, for example, an organic peroxide or hydroperoxide or an azo catalyst. An especially effective initiator system comprises an organic hydroperoxide coupled with a quaternary ammonium compound as activator. Graft polymerization may be effected in bulk or in an organic solvent, especially in an organic solvent in which polymers are soluble. Use of such solvent decreases viscosity of the mixture and permits a more efficient polymerization reaction.

Among solvents which may desirably be used are aromatic hydrocarbons, such as benzene, toluene, xylene, and aromatic naphthas, chlorinated hydrocarbons such as ethylene dichloride, esters such as ethyl propionate or butyl acetate, and also petroleum oils which are pure enough so as not to interfere with the polymerization. Solvent may be retained with the final polymer or it may be removed therefrom. The final co-polymer in solvent may be mixed with a good quality mineral oil, such as 100 to 150 neutral oil, or with a synthetic lubricant and the volatile solvent evaporated from the mixture to give a solution of co-polymer in oil or synthetic lubricant, such as dioctyl sebacate, dibutylphenyl phosphate, a silicate ester, or a silicone fluid.

The N-vinyl pyrrolidone monomer is heated with initiator in the presence of the backbone polymer to a polymerizing temperature, preferably between about 60° C. and about 225° C. Choice of temperature or range of temperature depends in part upon the initiator system to be used and upon such other factors as choice of monomer, solvent, and concentrations. Graft polymerization may be initiated at one temperature and continued at other temperatures. Initiator or initiator and activator may be added in portions. Different polymerization initiators may be used at different stages of polymerization during which solvent may be supplied or removed.

As initiator there is preferably used an organic hydroperoxide such as tert-butyl hydroperoxide, cumene hydroperoxide, diisopropylbenzene hydroperoxide, p-methane hydroperoxide, pinane hydroperoxide, 2,5-dimethylhexane-2,5-dihydroperoxide, or other tert-alkyl hydroperoxides, hydrocarbon-substituted benzene hydroperoxides, or terpene hydroperoxide. The initiator may be supplied as a single charge or added in portions as polymerization progresses.

Hydroperoxides become active as initiators at lower temperatures when used in conjunction with an activator. Especially useful activators are quaternary ammonium compounds, such as benzyltrimethylammonium chloride, dibenzyldimethylammonium bromide, butyldimethylbenzylammonium chloride, cetyltrimethylammonium chloride, dodecyldimethylbenzylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, nonylphenoxyethoxyethyltrimethylammonium chloride, diisobutylphenoxyethoxyethyldimethylbenzylammonium chloride, cetylpyridinium bromide, N-octyl-N-methylmorpholinium chloride, and bis-quarternary ammonium salts, such as those having quaternary nitrogens linked with an alkylene chain, an amide-containing chain, or an ether-containing chain.

In place of a hydroperoxide or a hydroperoxide-activator system there may be used other free radical polymerization initiators. These include peroxides such as benzoyl peroxide, acetyl peroxide, caproyl peroxide, lauroyl peroxide, di-tert-butyl perphthalate, tert-butyl perbenzoate, 2,2-bis(tert-butyl-peroxy) butane, or methyl ethyl ketone peroxide. There may likewise be used an azo catalyst such as azodiisobutyldimethyl azodiisobutylate, azobis (a-ethylbutylnitrile), or azobis (a,B-dimethylcapronitrile). The amount of initiator or initiators is preferably between about 0.01% and about 5% of the weight of monomers used.

The compositions of the present invention preferably contain about 2% to about 12% by weight (based on the total composition) of at least one of the above-described co-polymers, more preferably, about 3% to about 10% by weight of the total composition. In any event, the amount by weight of such copolymers in the compositions of this invention is at least equal to the amount of solid particles, e.g., graphite, molybdenum disulfide and the like, present. Preferably, the amount of co-polymer is at least about 2 times, more preferably at least about 3 times, the amount of solid particles.

The compositions of the present invention possess the advantageous combination of a high degree of effectiveness with respect to lubricity, dispersant-detergent properties, pour-point depressing action and viscosity index improvements. Further, the present compositions provide for improved fuel economy and reduced tendency to form deposits.

In addition to the advantages already described herein, lubricating compositions contemplated herein may contain other conventional agents, such as, for example, anti-oxidants, metal deactivators, pour point depressants, oiliness agents, blooming agents, peptizing agents, and the like.

3,574,576; 3,576,743; 3,578,422; 3,597,174; 3,639,110; 3,652,240; 3,655,351; 3,658,494; 3,658,495; 3,676,089; 3,701,640, 3,711,255; 3,717,447; 3,728,091; 3,746,520; 3,751,255; 3,756,793; 3,762,889; 3,764,281; 3,765,850; 3,773,479; 3,752,657; 3,753,670, 3,779,724 and 3,782,912.

An additional essential component of the present compositions is a minor amount, by weight, of at least one of certain co-polymers. The amount by weight of such co-polymers in the present compositions is at least equal to the amount of useful solid particles present. Such co-polymers are derived from the polymerization of (1) a N-vinyl pyrrolidone and (2) a oil soluble acrylic ester. These co-polymers preferably have molecular weights in the range of about 75,000 to about 1,500,000, more preferably, about 200,000 to about 1,000,000, and still more preferably about 700,000 to about 1,000,000. The molar ratio of N-vinyl pyrrolidone to oil-soluble acrylic ester in the presently useful co-polymers is preferably about 1:5 to about 1:15. In one preferred embodiment, the co-polymer is a graft co-polymer in which the N-vinyl pyrrolidone is grafted onto an oil soluble polymeric backbone prepared from at least one oil soluble acrylic ester.

N-vinyl pyrrolidones that may be used in the co-polymers useful in the composition of this invention may be represented by the structural formula:

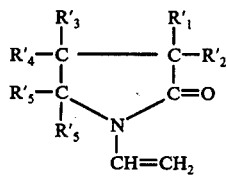

wherein $R'_1$, $R'_2$, $R'_3$, $R'_4$, $R'_5$ and $R'_6$ are independently selected from the group consisting of hydrogen and lower alkyl. Preferred lower alkyl groups contain from 1 to 4 carbon atoms. Preferably, each of the $R'_5$ is hydrogen.

Representative N-vinyl pyrrolidones within the scope of the above formula that are useful include N-vinyl pyrrolidone itself, 3-methyl-1-vinyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 4,5-dimethyl-1-vinyl pyrrolidone, 5,5-dimethyl-1-vinyl pyrrolidone, 3,3,5-trimethyl-1-vinyl pyrrolidone, 4-ethyl-1-vinyl pyrrolidone, 5-methyl-5-ethyl-1-vinyl pyrrolidone, 3,4,5-trimethyl-3-ethyl-1-vinyl pyrrolidone and other lower alkyl substituted N-vinyl pyrrolidones.

Also, within the scope of this invention are other cyclic N-vinyl amides such as N-vinyl caprolactam and its alkyl-substituted derivatives that may be included in the presently useful co-polymers, e.g., co-grafted onto the oil-soluble polymeric backbone.

The other essential monomer of the presently useful co-polymers is a material selected from alkyl acrylates, alkyl methacrylates or mixtures thereof with alkyl groups of sufficient average size to ensure solubility of the co-polymer, e.g., graft co-polymer, in the present lubricating oil composition. Oil-soluble acrylic esters useful as monomers, e.g., for forming the backbone polymer in the case of graft co-polymers, may be represented by the formula

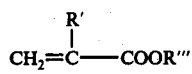

wherein R' represents hydrogen or methyl and R''' represents an oil solubilizing group, such as a substantially hydrocarbon radical containing about 8 to about 24 carbon atoms, especially an alkyl group of about 8 to about 24 carbon atoms. The alkyl group may be a straight chain or branched chain and preferably contains about 12 to about 18 carbon atoms. Representative acrylic and methacrylic esters that promote oil solubility comprise octyl, decyl, isodecyl, dodecyl, isododecyl, myristyl, cetyl, stearyl, eicosyl and tetracosyl acrylates and methacrylates.

The term "acrylic ester" in this invention includes both acrylates and methacrylates. Mixtures of both alkyl acrylates and alkyl methacrylates may be used.

In one preferred embodiment, lower alkyl acrylic esters, i.e., esters having alkyl groups smaller than about 8 carbon atoms and derived from acrylic or methacrylic acid, are used to replace a portion of the esters which have an oil solubilizing group. In general, they possess polymerizing characteristics similar to the acrylic esters which supply oil-solubility. Also, the presence of small alkyl groups in co-polymers may help improve such properties as pour point depression and viscosity index improvement. Typical lower acrylic esters are methyl, ethyl, propyl, butyl, amyl, and hexyl acrylates and methacrylates. These lower alkyl acrylic esters may be employed in amounts up to about 65% by weight of the total acrylates and/or methacrylates in the presently useful co-polymers.

In addition to the one or more of the above acrylic esters possessing oil-solubilizing groups and the aforementioned lower alkyl acrylic esters, there may be used to form the copolymers, e.g., the backbone of the presently useful graft co-polymers, in minor amounts, one or more other miscellaneous free radically polymerizable monoethylentically unsaturated compounds, particularly monovinylidene compounds, i.e., those having one $CH_2=C<$ group. These include substantially hydrocarbon, e.g., alkyl, esters of maleic, fumaric, and itaconic acids (including half esters thereof), acrylic acid, methacrylic acids, maleic anhydride, acrylic amides, maleic half amides, acrylonitrile, methacrylonitrile, vinyl alkyl ethers, vinyl alkyl thioethers, styrene, alkylstyrenes, and lower alkyl acrylic esters.

The substantially hydrocarbon groups in these other esters and in the ethers may be small or large. For example, alkyl groups containing 1 to about 20 carbon atoms, e.g., methyl, butyl, octyl, nonyl, and dodecyl to octadecyl and mixtures thereof, may be employed. Half esters of dicarboxylic acids are of interest in supplying both the ester function and the acid function, which is often desired and which can be converted to a salt form, as with barium, strontium, calcium, or magnesium. Such miscellaneous co-monomers were used in minor proportions and in amounts which do not interfere with oil-solubility of the final co-polymer. Of course, those having larger hydrocarbon groups may also assist in imparting oil-solubility.

In a similar way, there may be used in minor proportion polymerizable esters in which in place of an alkyl group, there may be used a cyclic-containing residue of an alcohol or ester-forming equivalent, typical whereof are phenyl, alkylphenyl, benzyl, cyclohexyl, alkylcy- The lubricating compositions of the present invention may be prepared in any conventional manner. For example, the various components may be brought together and blended at a slightly elevated temperature, i.e., about 100 to 130° F., to insure a uniform composition.

In many instances, the additives incorporated into the present lubricating compositions are available as a mixture in a mineral oil or other solvent carrier. Unless otherwise noted, the weight proportions given above refer to the amount of additive material on a carrier or solvent free basis.

The lubricating compositions of the present invention can be used to lubricate internal combustion engines. Maintaining (or causing to be maintained) a lubricating amount of the lubricating compositions of the present invention on the components of such internal combustion engine requiring lubrication, results in obtaining substantial benefits from the present invention.

The following examples illustrate clearly the present invention. However, these examples are not to be interpreted as specific limitations on the invention.

EXAMPLES 1 to 3

The following examples illustrate certain of the outstanding benefits of the present invention.

A series of three lubricating oil compositions were prepared by blending together individual components, noted below, at a slightly elevated temperature, i.e., about 100° F. to about 130° F., to insure proper mixing. The final compositions were as follows:

| Component, Wt.% | EXAMPLES | | |
|---|---|---|---|
| | 1 | 2 | 3 |
| Mineral Oil, 125 SUS at 100° F. | 84.0 | 74.7 | 74.6 |
| Conventional Additive Mixture[1] | 7.4 | 7.5 | 7.6 |
| Methacrylate Polymer[2] | 8.6 | 7.8 | — |
| Methacrylate-N-Vinyl Pyrrolidone Copolymer[3] | — | — | 7.8 |
| Graphite Dispersion[4] | — | 10.0 | 10.0 |

[1]This mixture is a commercially available combination of materials each of which is conventionally used in lubricating oil compositions. This mixture includes alkyl zinc dithiophosphate, both overbased and neutral calcium sulfonates, calcium phosphonatephenate and both an ashless dispersant and an ashless rust inhibitor. This mixture also included about 50% by weight of a light mineral oil as solvent for the active ingredients.
[2]A commercially available methacrylate polymer known and conventionally used to improve the viscosity index of lubricating oil polymers. Such polymer includes essentially no N-vinyl pyrrolidone. The material as used includes about 50% by weight of a mineral oil as solvent for the polymer. The polymer is believed to have an average molecular weight of about 800,000 and to be derived from a methacrylic ester containing about 16 carbon atoms per molecule.
[3]A mixture of methacrylate ester-N-vinyl pyrrolidone copolymer in about 50% by weight (based on the total mixture) of a mineral oil solvent. This mixture contains about 0.18% by weight of nitrogen. The copolymer is believed to be derived from a methacrylic ester containing about 16 carbon atoms per molecule and is prepared using conventional techniques. The copolymer is believed to have an average molecular weight of about 800,000 and a mole ratio of N-vinyl pyrrolidone to methacrylate ester of about 1 to 10.
[4]A mineral oil-based dispersion containing about 10% by weight of solid graphite particles which have an average (by weight) particle size of about 200 millimicrons. The dispersion also includes about 6% of a nitrogen and methacrylate-containingdispersant to aid in maintaining dispersion stability. This dispersant is believed to be derived from a methacrylic ester containing about 16 carbon atoms per molecule.

Each of these lubricating oil compositions was used to lubricate an internal combustion engine which, in turn, was operated through a Reference Sequence V C Test. This test, in which the engine is operated for 192 hours, is described in "Multicylinder Test Sequences for Evaluating Automotive Engine Oils--ASTM Special Technical Publication 315F", American Society for Testing and Materials (1973). This procedure is known to produce data which can be used to make valid comparisons of the effects various lubricating oil compositions have on engine sludge and varnish ratings under normal operating conditions.

Sludge and varnish ratings in the Reference Sequence V C Test are based upon visual inspection of various engine components and comparison with a series of CRC reference standards.

Results of this test using each of the above-described lubricating compositions are summarized below. For comparison purposes, minimum SE standard lubricating oil qualification ratings are also presented.

| REFERENCE SEQUENCE VC RESULTS | COMPOSITION | | | SE MINIMUM RATINGS |
|---|---|---|---|---|
| | 1 | 2 | 3 | |
| Average Overall Sludge Rating | 8.7 | 8.1 | 9.0 | 8.5 |
| Average Overall Varnish Rating | 8.3 | 7.8 | 8.5 | 8.0 |
| Piston Skirt Varnish Rating | 8.3 | 8.0 | 8.6 | 7.9 |

The above data indicate that the present compositions which include both solid particles and a co-polymer of a acrylic ester and an N-vinyl pyrrolidone provide substantially and surprisingly improved sludge and varnish ratings, for example, ratings which exceed the minimum standards required for qualification. These results are particularly surprising in view of the substantial decrease in sludge and varnish ratings (increased in sludge and varnish formation) caused by the inclusion of graphite solid particles, as is apparent from the results with Composition 2. Thus, the inclusion of a conventional viscosity index improver, which provides adequate sludge and varnish formation protection (see Example 1) when included in a composition without solid particles, fails to meet the SE qualification standards when such solid particles are added. However, SE standards are more than adequately met by the inclusion of the presently useful co-polymers in graphite-containing lubricating oil compositions.

While this invention has been described with respect to various specific examples and embodiments, it is to be understood that the invention is not limited thereto and that it can be variously practiced with in the scope of the following claims.

The embodiments of the invention in which an inclusive property or privilege is claimed are defined as follows:

1. A composition of matter comprising a major amount by weight of oil of lubricating viscosity; a minor amount by weight of solid particles effective to improve the lubricating properties of said composition, said solid particles being selected from the group consisting of graphite, molybdenum disulfide, zinc oxide and mixtures thereof; and a minor amount by weight, at least equal to the amount by weight of said solid particles, of at least one co-polymer of (1) an N-vinyl pyrrolidone, and (2) an oil soluble acrylic ester, said co-polymer being present in an amount effective to reduce the deposit forming tendencies of said composition.

2. The composition of claim 1 wherein a major portion of said solid particles have a maximum transverse dimension in the range of about 1 millimicron to about 2 microns.

3. The composition of claim 2 wherein said solid particles are graphite, said graphite being present in an amount of about 0.05% to about 5% by weight of the total composition and said co-polymer is present in an amount of about 2% to about 12% by weight of the total composition.

4. The composition of claim 3 wherein the molar ratio of said N-vinyl pyrrolidone to said oil soluble acrylic ester in said co-polymer is in the range of about 1:4 to about 1:20 and said co-polymer has a molecular weight in the range of about 75,000 to about 1,500,000.

5. The composition of claim 2 wherein said co-polymer is present in an amount at least about 2 times the amount of said solid particles and the molar ratio of said N-vinyl pyrrolidone to said oil soluble acrylic ester in said co-polymer is in the range of about 1:4 to about 1:20 and said co-polymer has a molecular weight in the range of about 75,000 to about 1,500,000.

6. The composition of claim 5 wherein said copolymer has a molecular weight in the range of about 200,000 to about 1,000,000.

7. The composition of claim 6 wherein the molar ratio of said N-vinyl pyrrolidone to said coil soluble acrylic ester in said co-polymer is in the range of about 1:5 to about 1:15 and said co-polymer has a molecular weight in the range of about 700,000 to about 1,000,000.

8. The composition of claim 4 wherein said co-polymer has a molecular weight in the range of about 200,000 to about 1,000,000 and is present in an amount at least about 2 times the amount by weight of said graphite.

9. The composition of claim 7 wherein said solid particles are graphite.

10. The composition of claim 8 wherein said solid particles are present in an amount of about 0.1% to about 2% by weight of the total composition and said co-polymer is present in an amount of about 3% to about 10% by weight of the total composition.

11. The composition of claim 9 wherein said co-polymer is present in an amount of at least about 2.5 times the amount of said graphite.

12. The composition of claim 10 wherein said co-polymer is present in an amount of at least about 3 times the amount of said graphite.

13. A method of lubricating an internal combustion engine comprising components requiring lubrication which comprises maintaining a lubricating amount of the composition of claim 1 on components of said engine requiring lubrication.

14. A method of lubricating an internal combustion engine comprising components requiring lubrication which comprises maintaining a lubricating amount of the composition of claim 3 on components of said engine requiring lubrication.

15. A method of lubricating an internal combustion engine comprising components requiring lubrication which comprises maintaining a lubricating amount of the composition of claim 7 on components of said engine requiring lubrication.

16. A method of lubricating an internal combustion engine comprising components requiring lubrication which comprises maintaining a lubricating amount of the composition of claim 8 on components of said engine requiring lubrication.

17. A method of lubricating an internal combustion engine comprising components requiring lubrication which comprises maintaining a lubricating amount of the composition of claim 11 on components of said engine requiring lubrication.

18. A method of lubricating an internal combustion engine comprising components requiring lubrication which comprises maintaining a lubricating amount of the composition of claim 12 on components of said engine requiring lubrication.

* * * * *